US012647332B2

(12) United States Patent
Mann

(10) Patent No.: US 12,647,332 B2
(45) Date of Patent: Jun. 2, 2026

(54) APPARATUSES, METHODS, AND COMPUTER PROGRAM PRODUCTS FOR PREDICTIVE DETERMINATIONS OF CAUSAL CHANGE IDENTIFICATION FOR SERVICE INCIDENTS

(71) Applicants: ATLASSIAN PTY LTD., Sydney (AU); ATLASSIAN US, INC., San Francisco, CA (US)

(72) Inventor: Christopher Mann, Sydney (AU)

(73) Assignees: ATLASSIAN PTY, LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 18/421,406

(22) Filed: Jan. 24, 2024

(65) Prior Publication Data

US 2024/0323106 A1     Sep. 26, 2024

Related U.S. Application Data

(63) Continuation of application No. 17/559,563, filed on Dec. 22, 2021, now Pat. No. 11,924,064.

(51) Int. Cl.
*H04L 41/0631* (2022.01)
*H04L 41/0604* (2022.01)
*H04L 41/16* (2022.01)
*H04L 41/5009* (2022.01)

(52) U.S. Cl.
CPC ...... *H04L 41/5012* (2013.01); *H04L 41/0609* (2013.01); *H04L 41/0631* (2013.01); *H04L 41/16* (2013.01)

(58) Field of Classification Search
None
See application file for complete search history.

(56) References Cited

U.S. PATENT DOCUMENTS

| | | | |
|---|---|---|---|
| 7,131,037 B1 | 10/2006 | Lefaive et al. | |
| 8,484,336 B2 | 7/2013 | Meir et al. | |
| 2008/0114874 A1 | 5/2008 | Meir et al. | |
| 2015/0106339 A1 | 4/2015 | Hasan et al. | |
| 2015/0347214 A1* | 12/2015 | Samuni | G06F 11/0709 |
| | | | 714/37 |
| 2017/0213142 A1 | 7/2017 | Kaluza et al. | |
| 2019/0104019 A1* | 4/2019 | Makovsky | G06F 8/34 |

(Continued)

OTHER PUBLICATIONS

U.S. Appl. No. 17/644,988, filed Dec. 17, 2021, by inventors Gupta et al., entitled "Apparatuses, Computer-Implemented Methods, and Computer Program Products for Improved Data Event Root Cause Identification and Remediation".

(Continued)

*Primary Examiner* — Joshua Joo
(74) *Attorney, Agent, or Firm* — Alston & Bird LLP

(57)     ABSTRACT

Methods, apparatuses, or computer program products provide for generating a predictive causal probability score data object. A complex federated service network may be monitored to identify a service incident data object associated with a service incident. A predictive causal machine learning model may generate a predictive causal probability score data object based at least in part on a service incident time associated with the service incident data object. The predictive causal probability score data object may be output.

20 Claims, 8 Drawing Sheets

(56) References Cited

U.S. PATENT DOCUMENTS

| | | | |
|---|---|---|---|
| 2019/0108465 A1 | 4/2019 | Zhou et al. | |
| 2020/0034222 A1* | 1/2020 | Bendiganavale | G06F 11/079 |
| 2020/0081788 A1* | 3/2020 | Kataki | G06F 11/0712 |
| 2021/0286614 A1* | 9/2021 | Nicolae | H04L 41/0895 |
| 2021/0400115 A1* | 12/2021 | Kuchibhotla | H04L 47/826 |
| 2022/0012113 A1 | 1/2022 | Puri et al. | |
| 2022/0070050 A1 | 3/2022 | D'Ippolito et al. | |
| 2022/0108402 A1 | 4/2022 | Jalal | |
| 2022/0182285 A1* | 6/2022 | Crowder | G06F 9/44505 |
| 2022/0198156 A1 | 6/2022 | Rao et al. | |
| 2022/0206889 A1* | 6/2022 | Johnston | G06F 40/137 |
| 2022/0247630 A1* | 8/2022 | Engi | H04L 41/0627 |
| 2023/0004835 A1 | 1/2023 | Sawhney et al. | |
| 2023/0025718 A1 | 1/2023 | Varnavas et al. | |
| 2023/0026714 A1 | 1/2023 | Nadger et al. | |
| 2023/0093091 A1 | 3/2023 | Ojha et al. | |
| 2023/0094373 A1 | 3/2023 | Muralidharan et al. | |
| 2023/0153725 A1* | 5/2023 | Turi | G06Q 10/0635 |
| | | | 705/7.28 |
| 2024/0275663 A1* | 8/2024 | Huet | H04L 41/064 |

OTHER PUBLICATIONS

U.S. Appl. No. 17/656,529, filed Mar. 25, 2022 by inventors Kumawat et al., entitled "Methods, Apparatuses, and Computer Program Products for Generating Service Health Status Data Objects and Rendering Health Status Monitoring User Interfaces".

U.S. Appl. No. 17/657,237, filed Mar. 20, 2022 by inventors Rao et al., entitled "Machine-Learning-Based Techniques for Predictive Monitoring of a Software Application Framework".

* cited by examiner

400

Monitor a complex federated service network to identify a service incident data object
401

Extract one or more service incident analysis attributes
402

Generate a predictive causal probability score data object using a predictive causal machine learning model
403

Output the predictive causal probability score data object
404

Cause generation of a causal change analysis interface on one or more client devices
405

FIG. 4

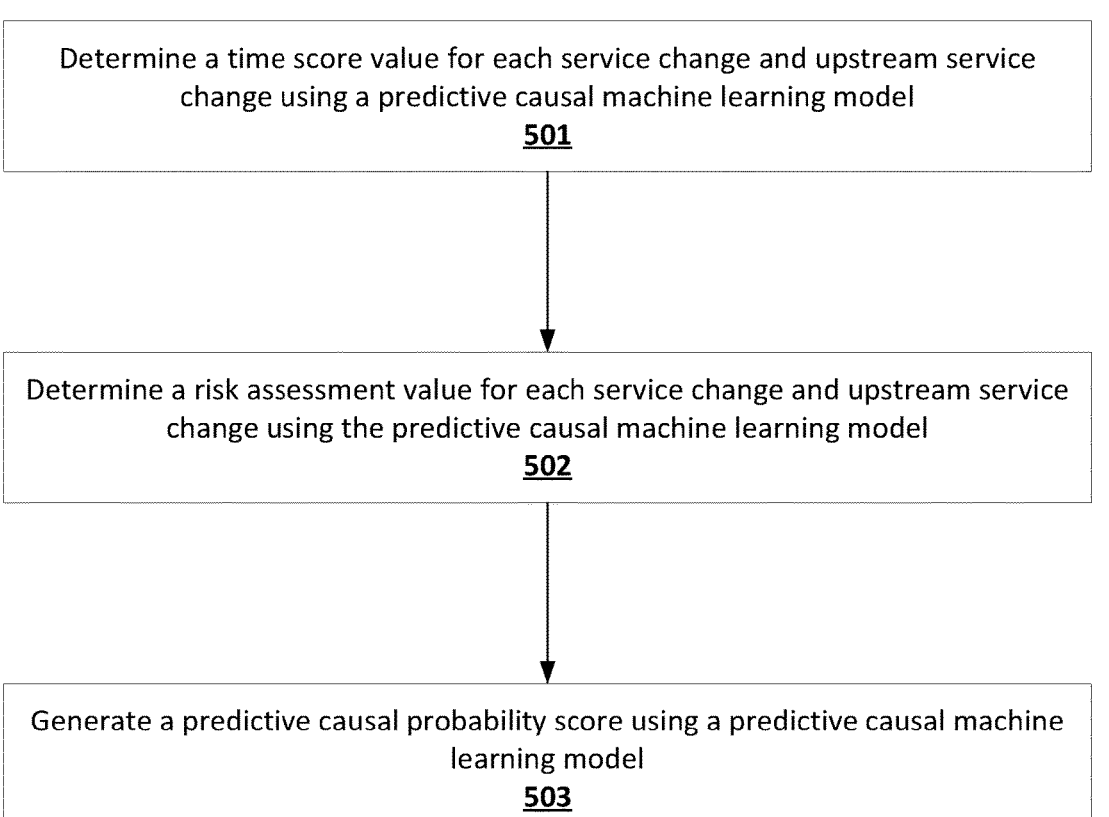
FIG. 5

600

Access a service incident training corpus
601

Identify one or more training feature data objects
602

Extract one or more training service incident analysis attributes
603

Train the predictive causal analysis machine learning model
604

Store the predictive causal analysis machine learning model in an associated memory
605

700

Determine whether the service change or upstream service change associated with the largest predictive causal probability score satisfies one or more certainty thresholds
701

Modify an impacted service or upstream service associated with the service change or upstream service change associated with the largest predictive causal probability score to a previous service version
704

FIG. 7

APPARATUSES, METHODS, AND COMPUTER PROGRAM PRODUCTS FOR PREDICTIVE DETERMINATIONS OF CAUSAL CHANGE IDENTIFICATION FOR SERVICE INCIDENTS

CROSS-REFERENCE TO RELATED APPLICATIONS

This application is a continuation of and claims priority to U.S. Nonprovisional application Ser. No. 17/559,563, filed Dec. 22, 2021, the contents of which are incorporated by reference herein in its entirety.

BACKGROUND

Various methods, apparatuses, and systems are configured to provide techniques for determining service incident predictive causal identification. Through applied effort, ingenuity, and innovation, these identified deficiencies and problems have been solved by developing solutions that are in accordance with the embodiments of the present invention, many examples of which are described in detail herein.

BRIEF SUMMARY

Embodiments of the present disclosure relate to apparatuses, methods, and computer program products for determining a predictive causal probability score data object associated with a service incident occurring within a federated service network.

In one example embodiment, an apparatus is provided. The example apparatus comprises at least one processor and at least one memory, the at least one memory having computer-coded instructions therein, wherein the computer-coded instructions are configured to, in execution with the at least one processor, cause the apparatus to, monitor the complex federated service network to identify a service incident data object associated with a service incident, the service incident data object comprising an impacted service identifier and one or more upstream service identifiers.

In some embodiments, the computer-coded instructions are further configured to, in execution with the at least one processor, cause the apparatus to generate, using a predictive causal machine learning model, a predictive causal probability score data object based at least in part on a service incident time associated with the service incident data object, wherein (i) the predictive causal probability score data object describes one or more predictive causal probability scores, (ii) each predictive causal probability score is associated with a particular service change associated with the impacted service identifier or a particular upstream service change associated with each of the one or more upstream service identifiers, and (iii) the predictive causal probability score is indicative of a probability the corresponding service change or upstream service change is a cause contributor of the service incident described by the service incident data object. In some embodiments, the computer-coded instructions are further configured to, in execution with the at least one processor, cause the apparatus to output the predictive causal probability score data object.

In some embodiments, the computer-coded instructions are further configured to, in execution with the at least one processor, cause the apparatus to determine a time score value for each service change and upstream service change, wherein the time of change value is based at least in part on the service incident time associated with the service incident data object and a service change time associated with the particular service change or upstream service change. In embodiments, the computer-coded instructions are further configured to, in execution with the at least one processor, cause the apparatus to generate, using the predictive causal machine learning model, a predictive causal probability score for each service change or upstream service change based at least in part on the corresponding time score value.

In some embodiments, the computer-coded instructions are further configured to, in execution with the at least one processor, cause the apparatus to determine a risk assessment value for each service change and upstream service change, wherein the risk assessment value is based at least in part on the one or more change risk factors associated with the corresponding impacted service identifier or upstream service identifier. In embodiments, the computer-coded instructions are further configured to, in execution with the at least one processor, cause the apparatus to generate, using the predictive causal machine learning model, a predictive causal probability score for each service change or upstream service change based at least in part on the corresponding risk assessment value.

In some embodiments, the computer-coded instructions are further configured to, in execution with the at least one processor, cause the apparatus to select one or more service changes and upstream service changes for which to generate a predictive causal probability score for based at least in part on a change time window.

In some embodiments, the computer-coded instructions are further configured to, in execution with the at least one processor, cause the apparatus to extract, using a service incident analysis layer, one or more service incident analysis attributes. In embodiments, the computer-coded instructions are further configured to, in execution with the at least one processor, cause the apparatus to generate, using the predictive causal machine learning model, the predictive causal probability score data object based at least in part on the one or more service incident analysis attributes.

In some embodiments, the computer-coded instructions are further configured to, in execution with the at least one processor, cause the apparatus to determine one or more service changes or upstream service changes associated with predictive causal probability scores which satisfy one or more threshold predictive causal probability scores. In some embodiments, the computer-coded instructions are further configured to, in execution with the at least one processor, cause the apparatus to generate the predictive probability score data object, wherein the predictive probability score data object includes only the one or more service changes or upstream service changes which satisfy the one or more threshold predictive causal probability scores.

In some embodiments, the computer-coded instructions are further configured to, in execution with the at least one processor, cause the apparatus to determine one or more service changes or upstream service changes associated with predictive causal probability scores which satisfy one or more threshold predictive causal probability scores. In embodiments, the computer-coded instructions are further configured to, in execution with the at least one processor, cause the apparatus to modify an impacted service or upstream service associated with the service change or upstream service change associated with the largest predictive causal probability score to a historical version.

In some embodiments, the computer-coded instructions are further configured to, in execution with the at least one processor, cause the apparatus to determine one or more service changes or upstream service changes associated with predictive causal probability scores which satisfy one or more threshold predictive causal probability scores. In embodiments, the computer-coded instructions are further configured to, in execution with the at least one processor, cause the apparatus to determine whether the service change or upstream service change associated with the largest predictive causal probability score satisfies one or more certainty threshold scores.

In some embodiments, the computer-coded instructions are further configured to, in execution with the at least one processor, cause the apparatus to, in an instance in which the service change or upstream service change associated with the largest predictive causal probability score satisfies one or more certainty threshold scores, modify an impacted service or upstream service associated with the service change or upstream service change associated with the largest predictive causal probability score to a historical version in an instance the service change or upstream service change associated with the largest predictive causal probability score satisfies one or more certainty threshold scores.

In some embodiments, the computer-coded instructions are further configured to, in execution with the at least one processor, cause the apparatus to cause generation of a causal change analysis interface on one or more client devices, wherein the causal change analysis interface comprises a predictive causal probability score element rendered based at least in part on the predictive causal probability score data object.

In some embodiments, the predictive probability score data object comprises a ranked list of the one or more service changes or upstream service changes based at least in part on the corresponding predictive causal probability score for each service changes or upstream service changes.

Embodiments of the present disclosure also relate to apparatuses, methods, and computer program products for training a predictive causal analysis machine learning model. In example embodiments, an apparatus is provided, the apparatus comprising at least one processor and at least one memory, the at least one memory having computer-coded instructions therein, wherein the computer-coded instructions are configured to, in execution with the at least one processor, cause the apparatus to access a service incident training corpus comprising a plurality of service incident data objects, impacted service data, and upstream service data. In some embodiments, the computer-coded instructions are further configured to, in execution with the at least one processor, cause the apparatus to identify one or more training feature data objects from the plurality of service incident data objects.

In some embodiments, the computer-coded instructions are further configured to, in execution with the at least one processor, cause the apparatus to extract, utilizing a service incident analysis layer, one or more training service incident analysis attributes from the service incident training corpus based at least in part on the identified training feature data objects. In some embodiments, the computer-coded instructions are further configured to, in execution with the at least one processor, cause the apparatus to train the predictive causal analysis machine learning model based at least in part on the one or more training service incident analysis attributes.

In some embodiments, generating a predictive causal probability score data object utilizing the predictive causal analysis machine learning model is based at least in part on a machine learned correlation between the one or more training service incident analysis attributes and one or more service changes or upstream service changes corresponding to an impacted service identifier or one or more upstream service identifiers.

In some embodiments, the one or more training service incident analysis attributes comprise at least one of a service incident time associated with a service incident data object, a service change time for one or more service changes and upstream service changes associated with the service code data or upstream code data, or a risk assessment value for one or more service changes and upstream service changes associated with the service code data or upstream code data.

In some embodiments, the computer-coded instructions are further configured to, in execution with the at least one processor, cause the apparatus to store the predictive causal analysis machine learning model in an associated memory.

Various other embodiments are also described in the following detailed description and in the appended claims.

BRIEF DESCRIPTION OF THE SEVERAL VIEW OF THE DRAWINGS

Having thus described some embodiments in general terms, references will now be made to the accompanying drawings, which are not drawn to scale, and wherein:

FIG. 4 is a flowchart diagram of an example process for determining a predictive causal probability score data object in accordance with at least some embodiments of the present invention.

FIG. 5 is a flowchart diagram of an example process for generating a predictive causal probability score in accordance with at least some embodiments of the present invention.

FIG. 7 is a flowchart diagram of an example process for modifying an impacted service or upstream service in accordance with at least some embodiments of the present invention.

DETAILED DESCRIPTION OF VARIOUS EMBODIMENTS

Figure 1:
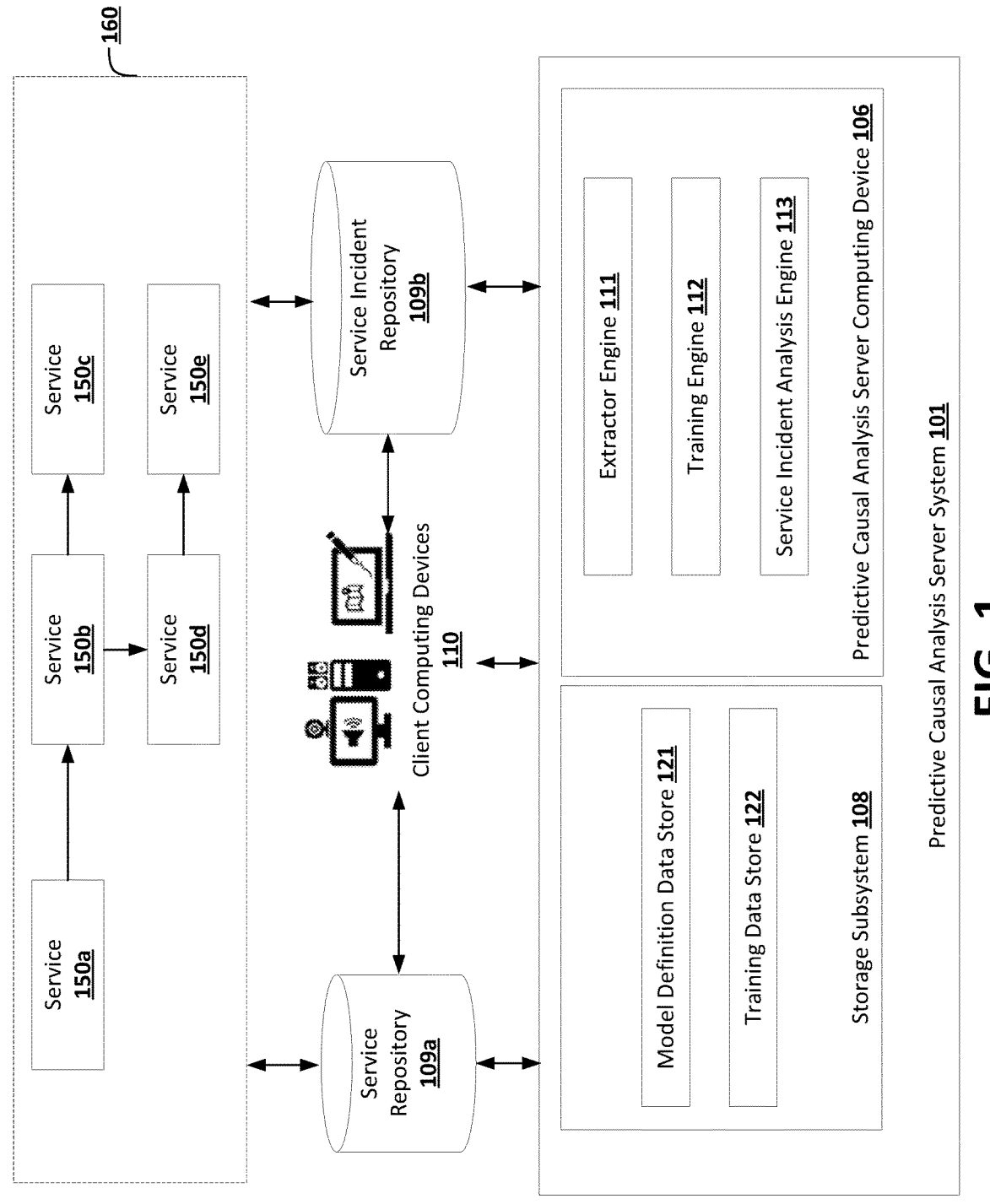
FIG. 1 is a block diagram of an example predictive causal analysis server system architecture within which at least some embodiments of the present invention may operate.

Various embodiments of the present disclosure will now be described more fully hereinafter with reference to the accompanying drawings, in which some, but not all embodiments of the present disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

Overview

The deployment of large federated service management platforms involve interdependent services that support a myriad of software features and applications. Indeed, some large federated service management platforms may be comprised of topologies of 1,500 or more interdependent services. Such federated service management platforms are nimble, highly configurable, and enable robust collaboration and communication between users at the individual, team, and enterprise level.

Each service of the federated service management platform may be configured to support a particular feature or application by defining a set of operations and may further be configured to integrate with one or more other services to perform one or more functionalities. As such, the services that combine to collectively support a federated service management platform are often associated with upstream services dependencies, from which a particular service depends, as well as downstream service dependencies, which the particular service influences.

Due to the interconnectedness between services, changes in the set of operations defined by a service may impact other services as well. However, such impacts may not be immediately or readily apparent. Changes to a particular service may be a cause contributor to a service incident, which may interrupt the operations of such service as well as one or more downstream services. In many instances, it may be difficult to accurately determine one or more cause contributors of a service incident, therefore making it difficult and time consuming to remedy the cause contributors of such a service incident.

Given the vast topography of many modern service architectures, determination of the cause contributors of a service incident is not easy and often requires manually intensive investigation of code changes for all affected services and any upstream services. Unfortunately, such manual investigations do not scale well particularly as large numbers of new applications, services, and database structures come online. The rapid growth of modern federated service management platforms introduces an ever growing network of interdependencies and more complex data object traffic (e.g., transmission and receipt of one or more data objects between services or applications, etc.), that need to be monitored for potential incident cause identification. For example, the introduction of a new service into an existing cloud-based instance of a federated service management platform may trigger requests by the new service for data object sets that differ from those requested by other services associated with the federated service management platform. Thus, data object usage and transmission patterns may be open to continuous change, can go out of date very quickly, and can rapidly overwhelm manual service incident cause investigation processes.

Various embodiments of the present invention address technical problems associated with automatically determining a predictive causal probability score data object associated with a service incident. The predictive causal probability score data object may be indicative of the probability a particular change in a service (e.g., an affected service and/or upstream services) may become one of one or more cause contributor of the service incident. The disclosed techniques can be utilized by a predictive causal analysis server system to efficiently and accurately determine a predictive causal probability score for each service and/or upstream service change indicative of the likelihood the particular service change is a cause contributor of the service incident. In one or more embodiments, a causal change analysis interface may be generated and provided to one or more client devices such that one or more end users may be presented with the predictive causal probability scores for the one or more service changes and/or upstream service changes. This may aid the one or more end users tasked with making one or more decisions regarding determining one or more cause contributors of a service incident, such as whether to rollback a particular service and what version to modify the service to. In some embodiments, the predictive causal analysis server system may automatically modify one or more services to a historical service version.

Accordingly, various embodiments of the present invention reduce the amount of time an end user may take to determine one or more cause contributors of service incident, thereby reducing the overall expenditure of manual and computational resources to determine the one or more cause contributors of such service incidents. Additionally, the present invention may enable an end user to quickly and easily determine a version a service should be modified to.

Definitions

As used herein, the term "service" refers to a computer functionality or a set of computer functionalities, such as the retrieval of specified information or the execution of a set of operations, with a purpose that different clients can reuse for their respective purposes, together with the policies that should control its usage, for example, based on the identity of the client (e.g., an application, etc.) requesting the service. In some embodiments, each service may be associated with one or more dependency relationships. In particular, a service may have an upstream dependency relationship with one or more associated upstream services which influence the particular service as well as a downstream dependency relationship with one or more associated downstream services which are influenced by the particular service. Furthermore, each service may be associated with one or more service metadata. Service metadata may include a priority category, service change time for one or more service changes to the service, a current service version number, one or more historical service version numbers, a risk assessment value for each service change to the service, a snippet identifier, a branch identifier, a workspace identifier, a scope identifier, a user identifier, and/or the like. Additionally, the service may be stored, offered, and utilized by a single computing device to local applications stored thereon and in such embodiments a network would not be required. In some embodiments, services may be accessed by other services via a plurality of APIs, for example, JavaScript Object Notation (JSON), Extensible Markup Language (XML), Simple Object Access Protocol (SOAP), Hypertext Markup Language (HTML), the like, or combinations thereof. In some embodiments, services may be configured to capture or utilize database information and asynchronous communications via message queues (e.g., Event Bus). Non-limiting examples of services include an open source API definition format, an internal developer tool, web based HTTP components, databased components, and asynchronous message queues which facilitate service-to-service communications.

The term "application," "app," or similar terms refer to a computer program or group of computer programs designed for use by and interaction with one or more networked or remote computing devices. In some embodiments, an application refers to a mobile application, a desktop application, a command line interface (CLI) tool, or another type of application. Examples of an application comprise workflow engines, component desk incident management, team collaboration suites, cloud components, word processors, spreadsheets, accounting applications, web browsers, email clients, media players, file viewers, videogames, and photo/video editors. An application can be supported by one or more services either via direct communication with the service or indirectly by relying on a service that is in turn supported by one or more other services.

The term "features", "functions", "functionalities", or similar terms refer to a set of services that are interconnected and independently configured to provide a monolith service. In some embodiments, a feature is configured with one or more APIs integrated with one or more other features and/or one or more other applications. In some embodiments, a feature is a single-function module with a defined set of interfaces and/or a defined set of operations configured to integrate with one or more other features and/or one or more other applications to provide a monolith service. In some embodiments, each feature may refer to a computer functionality or a set of computer functionalities, such as the retrieval of specified information or the execution of a set of operations, with a purpose that different clients can reuse for their respective purposes, together with the policies that should control its usage, for example, based on the identity of the client (e.g., an application, etc.) requesting the service. Additionally, the feature may be stored, offered, and utilized by a single computing device to local applications stored thereon and in such embodiments a network would not be required. In some embodiments, features may be accessed by other features via a plurality of APIs, for example, JavaScript Object Notation (JSON), Extensible Markup Language (XML), Simple Object Access Protocol (SOAP), Hypertext Markup Language (HTML), the like, or combinations thereof. In some embodiments, the feature may be configured to capture or utilize database information and asynchronous communications via message queues (e.g., Event Bus). Non-limiting examples of features include an open source API definition format, an internal developer tool, web based HTTP components, databased components, and asynchronous message queues which facilitate feature-to-feature communications.

The term "service registry" refers to a data structure configured to store information regarding one or more services. In some embodiments, the service registry may store the one or more upstream and or downstream dependencies of the one or more services within a particular federated service management platform. In some embodiments, the service registry may also store a priority classification of each service for the one or more services of the federated service management platform. For example, in some embodiments, a service may be categorized into a tier 1, tier 2, tier 3, tier 4, or tier 5 priority category. In some embodiments, decreasing tier levels may indicate an increase in the service priority. For example, the tier 5 priority category may indicate the service is a low priority service while a tier 1 priority category may indicate the service is a high priority service. The priority category a service belongs to may be based on a variety of factors including the interconnectedness of the service with other services (e.g., number of downstream services), security risk associated with the service, and/or the like. In some embodiments, the priority category for each service may be manually assigned by one or more end users and stored in the service registry.

The term "service incident data object" refers to a data structure that is associated with a service incident comprising at least an impacted service identifier and one or more upstream service identifiers. A service incident may occur in response to one or more changes to code and/or operation definitions for a particular service or upstream service. The service incident may impact the service and/or downstream services such that said service and/or downstream services do not operate as intended. For example, the service and/or one or more downstream services may experience one or more runtime errors and/or may be unable to execute one or more operations. In some embodiments, the service incident data object may include a service incident identifier which identifies the particular service incident, a service incident type, a service incident time, and/or the like. In some embodiments, the service incident data object may further include the impacted service identifier of the service which was impacted by the service incident as well as one or more upstream service identifiers associated with the impacted service identifier. The one or more upstream service identifiers may be determined based at least in part on service information stored in the service registry. In some embodiments, the service incident data object may further include service metadata pertaining to the service identifier and/or one or more upstream service identifiers. For example, such metadata may include a priority category, service change time for one or more service changes or upstream service changes, a current service version number, one or more historical service version numbers, a risk assessment value for each service change to the service or upstream service, a snippet identifier, a branch identifier, a workspace identifier, a scope identifier, a user identifier, and/or the like.

The term "service incident analysis layer" refers to a data construct configured to extract one or more features from a service incident data object, training feature data objects, and/or the like. The service incident analysis layer is a pre-processing layer configured to extract one or more relevant features based at least in part on the service incident data object and generate one or more service incident analysis attributes. For example, the service incident analysis layer may extract a service incident time from the service incident data object. As another example, the service incident analysis layer may extract an impacted service identifier and one or more upstream service identifiers. The service incident analysis layer may then extract associated service metadata from service registry. For example, the service incident analysis layer may extract a service change time for one or more service changes or upstream service changes, a current service version number, one or more historical service version numbers, a risk assessment value for each service change to the service or upstream service, and/or the like from the service metadata.

The term "service incident analysis attributes" refers to a data structure configured to describe one or more relevant features of a service incident data object and/or based at least in part on the service incident data object. The one or more service incident analysis attributes are extracted using a service incident analysis layer. The one or more service incident analysis attributes are provided as input into one or more predictive causal machine learning models and used at least in part to determine a predictive causal probability score data object. For example, the service incident analysis attributes may include a service incident time as extracted from the service incident data object. As another example, the service incident analysis attributes may include an impacted service identifier and one or more upstream service identifiers as extracted from the service incident data object. The service incident analysis attributes may include associated service metadata from service registry. For example, the service incident analysis attributes may include a service change time for one or more service changes or upstream service changes, a current service version number, one or more historical service version numbers, a risk assessment value for each service change to the service or upstream service, and/or the like from the service metadata.

The term "predictive causal machine learning model" refers to a data structure that is configured to describe parameters, hyper-parameters, and/or stored operations of a machine learning model that is configured to process one or more service incident analysis attributes associated with service incident data object in order to generate a predictive causal probability score data object. The predictive causal probability score data object may include one or more predictive causal probability scores. Each predictive causal probability score may be associated with a particular service change associated with the impacted service identifier or upstream service change associated with the one or more upstream service identifiers.

In some embodiments, the predictive causal machine learning model may be configured to determine a time of change value for each service change and upstream service change. The service incident analysis layer may determine the time of change value based at least in part on the service incident time associated with the service incident data object and a service change time associated with the particular service change or upstream service change. Alternatively, the predictive causal machine learning model may receive the time of change value as a service incident analysis attribute.

In some embodiments, the predictive causal machine learning model may be configured to determine a predictive causal probability score for a service change or upstream service change based at least in part on the corresponding time of change value. In some embodiments, the predictive causal machine learning model may be configured to determine a predictive causal probability score based at least in part on a risk assessment value for the particular service change or upstream service change.

In some embodiments, the predictive causal machine learning model is a machine learning model comprising a neural network framework. In some embodiments, the predictive causal machine learning model is a sequence-to-sequence (seq2seq) machine learning model. The generated predictive causal probability score data object is configured to describe one or more predictive causal probability scores. The one or more predictive causal probability scores may be based at least in part on a machine learned correlation between the one or more service incident analysis attributes and one or more service changes or upstream service changes. For example, a predictive causal probability score may be a value between 0 and 1, where 0 indicates no probability that the service change was a cause contributor for the service incident and 1 indicates the service change was absolutely a cause contributor for the service incident. As another example, a predictive causal probability score may be a percentage between 0 and 100, where 0 indicates no probability that the service change was a cause contributor for the service incident and 100 indicates the service change was the absolutely a cause contributor for the service incident. In some embodiments, the parameters and/or hyper-parameters of a predictive causal machine learning model may be represented as values in a one-dimensional array, such as a vector, or a two-dimensional array, such as a matrix.

The term "causal change analysis interface" refers to a formatted version of one or more predictive causal probability score objects to facilitate a visualization and/or human interpretation of data associated with the predictive causal probability score object via an electronic interface, such as a graphical user interface rendered to a display of a client device. In one or more embodiments, a causal change analysis interface may additionally or alternatively be formatted for transmission via one or more networks. In one or more embodiments, a causal change analysis interface may include one or more graphical elements and/or one or more textual elements. The causal change analysis interface may include a predictive causal probability score element indicative of one or more predictive causal probability scores determined for service incident data object. In some embodiments, the predictive causal probability score element may include a ranked list of the service change and/or upstream service change and the associated predictive causal probability scores. In some embodiments, the causal change analysis interface may include a service incident element based at least in part on the service incident data object and/or service incident alert attributes.

The terms "data," "content," "digital content," "information," and similar terms may be used interchangeably to refer to data capable of being transmitted, received, and/or stored in accordance with embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The terms "computer-readable storage medium" refers to a non-transitory, physical or tangible storage medium (e.g., volatile or non-volatile memory), which may be differentiated from a "computer-readable transmission medium," which refers to an electromagnetic signal. Such a medium can take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical, infrared waves, or the like. Signals include man-made, or naturally occurring, transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH- EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums can be substituted for or used in addition to the computer-readable storage medium in alternative embodiments.

The terms "client device," "computing device," "network device," "computer," "user equipment," and similar terms may be used interchangeably to refer to a computer comprising at least one processor and at least one memory. In some embodiments, the client device may further comprise one or more of: a display device for rendering one or more of a graphical user interface (GUI), a vibration motor for a haptic output, a speaker for an audible output, a mouse, a keyboard or touch screen, a global position system (GPS) transmitter and receiver, a radio transmitter and receiver, a microphone, a camera, a biometric scanner (e.g., a fingerprint scanner, an eye scanner, a facial scanner, etc.), or the like. Additionally, the term "client device" may refer to computer hardware and/or software that is configured to access a component made available by a server. The server is often, but not always, on another computer system, in which case the client accesses the component by way of a network. Embodiments of client devices may include, without limitation, smartphones, tablet computers, laptop computers, personal computers, desktop computers, enterprise computers, and the like. Further non-limiting examples include wearable wireless devices such as those integrated within watches or smartwatches, eyewear, helmets, hats, clothing, earpieces with wireless connectivity, jewelry and so on, universal serial bus (USB) sticks with wireless capabilities, modem data cards, machine type devices or any combinations of these or the like.

The term "circuitry" may refer to: hardware-only circuit implementations (e.g., implementations in analog circuitry and/or digital circuitry); combinations of circuits and one or more computer program products that comprise software and/or firmware instructions stored on one or more computer readable memory devices that work together to cause an apparatus to perform one or more functions described herein; or integrated circuits, for example, a processor, a plurality of processors, a portion of a single processor, a multicore processor, that requires software or firmware for operation even if the software or firmware is not physically present. This definition of "circuitry" applies to all uses of this term herein, including in any claims. Additionally, the term "circuitry" may refer to purpose built circuits fixed to one or more circuit boards, for example, a baseband integrated circuit, a cellular network device or other connectivity device (e.g., Wi-Fi card, Bluetooth circuit, etc.), a sound card, a video card, a motherboard, and/or other computing device.

The term "server computing device" refers to a combination of computer hardware and/or software that is configured to provide a predictive causal probability score data object to a client device. An example of a server computing device is the predictive causal analysis server system 101 of FIG. 1. In some embodiments, a server computing device communicates with one or more client computing devices using one or more computer networks.

The term "application," "app," or similar terms refer to a computer program or group of computer programs designed for use by and interaction with one or more networked or remote computing devices. In some embodiments, an application refers to a mobile application, a desktop application, a command line interface (CLI) tool, or another type of application. Examples of an application comprise workflow engines, component desk incident management, team collaboration suites, cloud components, word processors, spreadsheets, accounting applications, web browsers, email clients, media players, file viewers, videogames, and photo/video editors. An application can be supported by one or more services either via direct communication with the service or indirectly by relying on a service that is in turn supported by one or more other services.

Thus, use of any such terms, as defined herein, should not be taken to limit the spirit and scope of embodiments of the present disclosure.

Example System Architecture

Methods, apparatuses, and computer program products of the present disclosure may be embodied by any of a variety of devices. For example, the method, apparatus, and computer program product of an example embodiment may be embodied by a networked device (e.g., an enterprise platform, etc.), such as a server or other network entity, configured to communicate with one or more devices, such as one or more query-initiating computing devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, the like or any combination of the aforementioned devices.

FIG. 1 depicts an exemplary architecture 100, such as a federated service management platform, for generating a predictive causal probability score data object. The architecture 100 includes one or more client computing devices 110, one or more repositories 109*a-b*, a plurality of services 150*a-e* within a service registry 160, and a predictive causal analysis server system 101. The federated service management platform 100 may include a plurality of services 150*a-e*. A service registry 160 may be associated with the plurality of services 150*a-e*. Each service 150*a-e* may be associated with a service repository 109*a* configured to store code used by the particular service, which may be used to perform a particular task. For example, service 150*a* may perform operations related to user credential authorization and service 150*b* may perform operations related to fetching application content data for rendering an application home screen following successful user authentication. The services 150*a-e* which form the federated service management platform 100 may have associated upstream and/or downstream service dependencies. For example, service 150*b* may have an upstream service dependency with service 150*a* such that service 150*b* is influenced by service 150*a*. Additionally, service 150*b* may also have downstream service dependencies with services 150*c*, 150*d*, 150*e*, such that service 150*b* influences service 150*c*, 150*d*, and 150*e*, either directly or indirectly. These upstream and downstream service dependencies for each service may be defined in the service registry 160. Although five services are depicted in FIG. 1, it should be appreciated that a federated service management platform 100 may include any number of services with any number of upstream dependencies and/or downstream dependencies.

As previously discussed, each service may be associated with a service repository, such as service repository 109*a*. Although only one service repository is shown, each service 150*a-e* may be associated with a particular service repository. Each service repository 109*a* may be configured to store code which influences one or more components and/or services. When a modification to code stored within a service repository is performed, the service undergoes a service change. Each service change is associated with a service change time, version number, and/or the like such that each change to the service may be traced. Each service repository 109a may be communicatively coupled, such as via a wired or wireless network connection, to one or more client computing devices such that they are accessible to said one or more client computing devices.

Similarly, a service incident repository 109b may also be communicatively coupled, such as via a wired or wireless network connection, to one or more client computing devices such that they are accessible to said one or more client computing devices. The service incident repository 109b may be configured to store one or more service incident data objects. In an event that service incident is identified within the federated service management platform, the service incident data object may be stored in the service incident repository.

A predictive causal analysis server system 101 may also be communicatively coupled, such as via a wired or wireless network connection, to one or more client computing devices such that they are accessible to said one or more client computing devices. The predictive causal analysis server system 101 is configured to store training data and model definition data in a storage subsystem 108, receive service risk analysis requests, extract one or more service incident analysis attributes using the predictive causal analysis server computing device 106, generate a predictive causal probability score data object using the predictive causal analysis server computing device 106, train one or more predictive causal machine learning models using the predictive causal analysis server computing device 106, and provide generated causal change analysis interface data to client computing devices 110.

The storage subsystem 108 of the predictive causal analysis server system 101 may be configured to store one or more service incident data objects. The predictive causal analysis server system 101 may be communicatively coupled to one or more repositories, such as service repository 109a, service incident repository 109b, and/or service registry 160 and may retrieve the one or more service incident data objects, service change metadata, and/or the like from the respective repository and store the objects in the storage subsystem 108.

The predictive causal analysis server computing device 106 of the predictive causal analysis server system 101 includes an extractor engine 111, a training engine 112, and a service incident analysis engine 113. The extractor engine 111 may be configured to extract one or more service incident analysis attributes based at least in part on a service incident data object using a service incident analysis layer. The service incident analysis engine 113 may be configured to generate a predictive causal probability score data object based at least in part on the one or more service incident analysis attributes using one or more predictive causal machine learning models. The training engine 112 may be configured to train the one or more predictive causal machine learning models in accordance with the training data stored in the storage subsystem 108, such as within training data store 122.

The predictive causal analysis server computing device 106 may be configured to train one or more predictive causal machine learning models based at least in part on the training data store 122 stored in the storage subsystem 108 and by utilizing training engine 112, store trained the one or more trained predictive causal machine learning models as part of the model definition data store 121 stored in the storage subsystem 108, and utilize the one or more trained predictive causal machine learning models to generate predictive causal probability score data objects based at least in part on a service incident data object.

Exemplary Predictive Causal Analysis Server Computing Device

Figure 2:
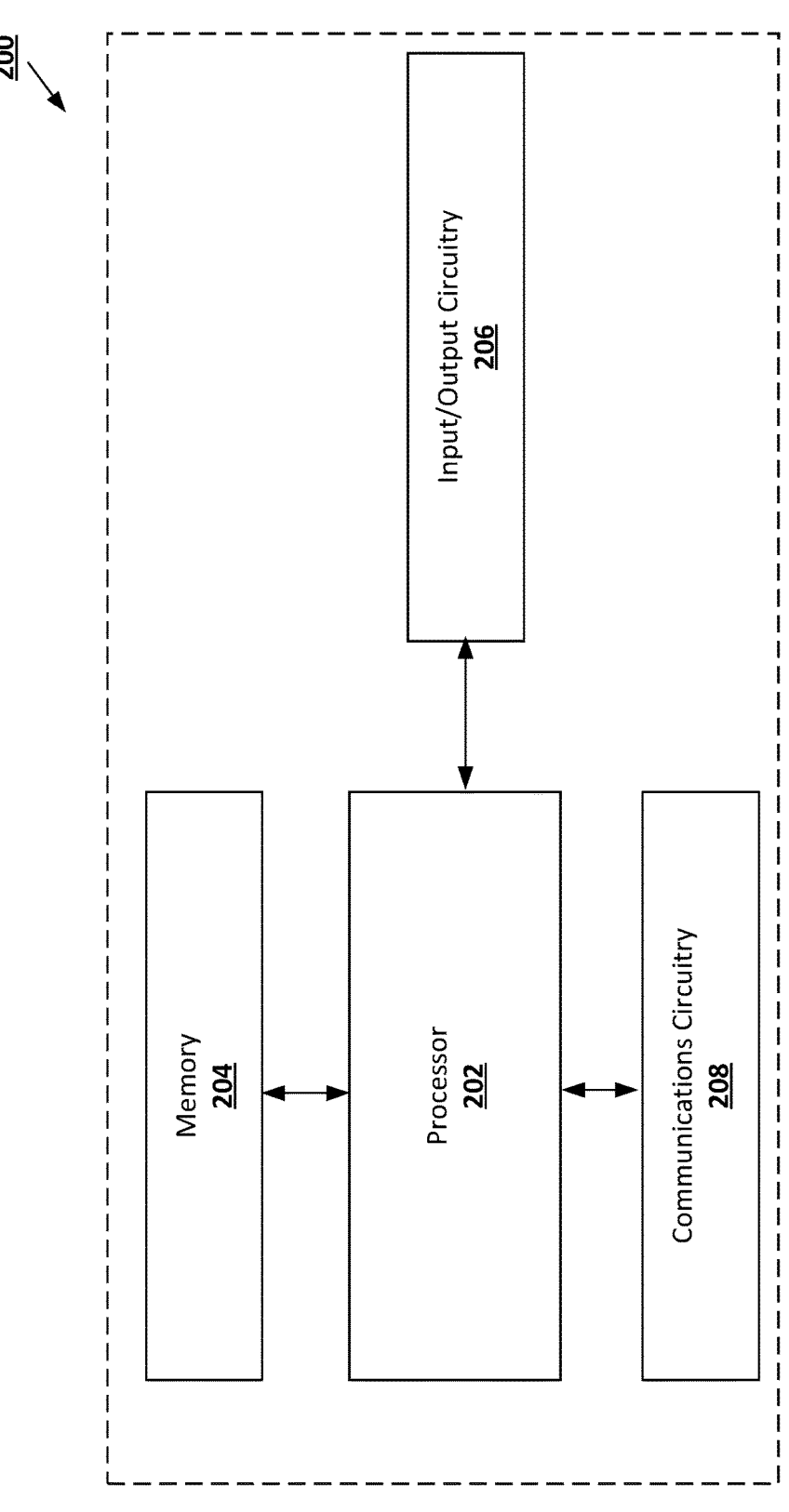
FIG. 2 is a block diagram of an example predictive causal analysis server computing device structured in accordance with at least some embodiments of the present invention.

The predictive causal analysis server computing device 106 may be embodied by one or more computing systems, such as apparatus 200 shown in FIG. 2. The apparatus 200 may include processor 202, memory 204, input/output circuitry 206, and communications circuitry 208. The apparatus 200 may be configured to execute the operations described herein. Although these components 202-208 are described with respect to functional limitations, it should be understood that the particular implementations necessarily include the use of particular hardware. It should also be understood that certain of these components 202-208 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present invention.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a query-initiating computing device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/ or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally, or alternatively, the communications circuitry 208 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

Exemplary Client Computing Device

Figure 3:
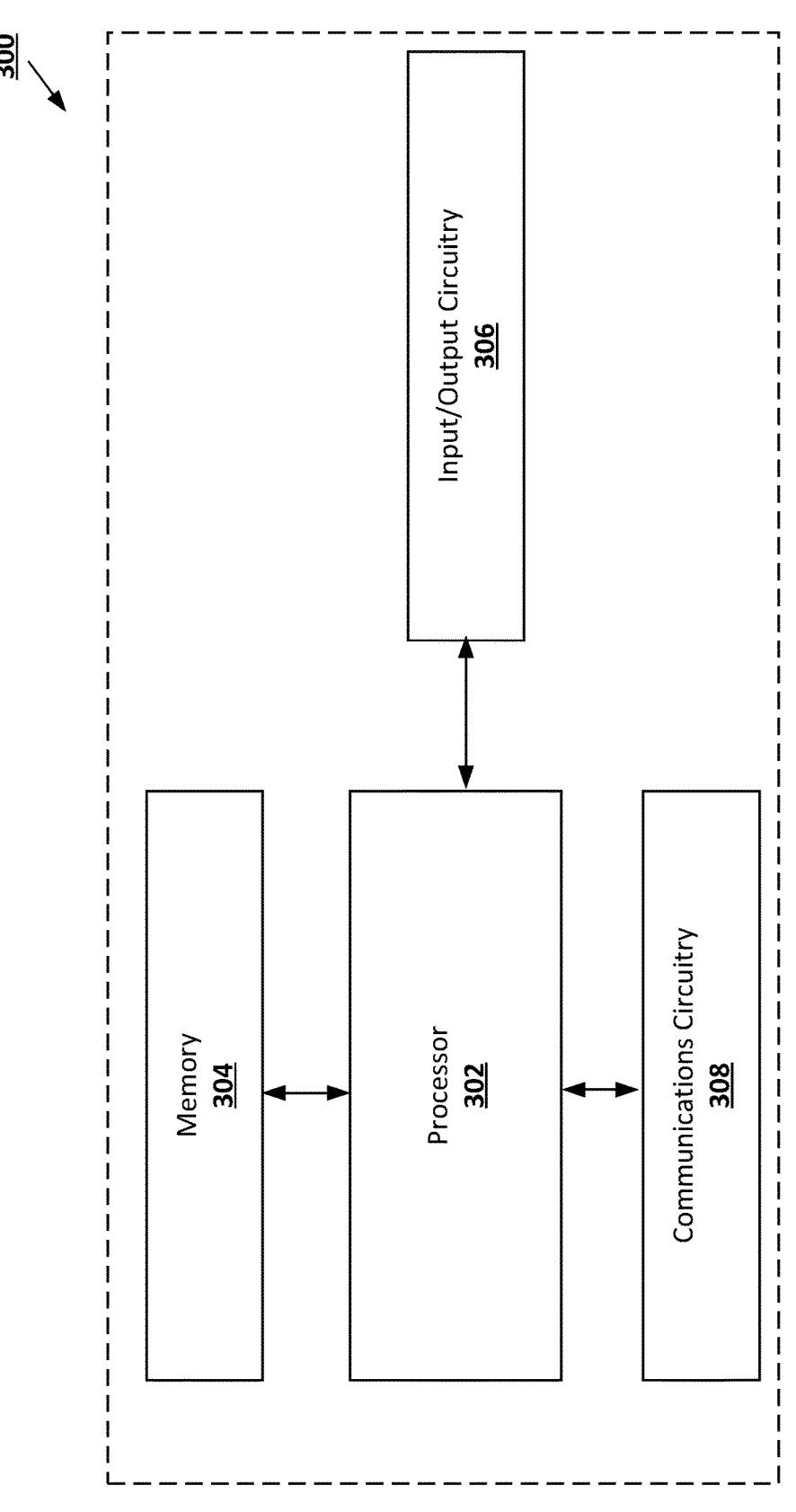
FIG. 3 is a block diagram of an example client computing device structured in accordance with at least some embodiments of the present invention.

Referring now to FIG. 3, a client computing device 110 may be embodied by one or more computing systems, such as apparatus 300 shown in FIG. 3. The apparatus 300 may include processor 302, memory 304, input/output circuitry 306, and a communications circuitry 308. Although these components 302-308 are described with respect to functional limitations, it should be understood that the particular implementations necessarily include the use of particular hardware. It should also be understood that certain of these components 302-308 may include similar or common hardware. For example, two sets of circuitries may both leverage use of the same processor, network interface, storage medium, or the like to perform their associated functions, such that duplicate hardware is not required for each set of circuitries.

In some embodiments, the processor 302 (and/or co-processor or any other processing circuitry assisting or otherwise associated with the processor) may be in communication with the memory 304 via a bus for passing information among components of the apparatus. The memory 304 is non-transitory and may include, for example, one or more volatile and/or non-volatile memories. In other words, for example, the memory 304 may be an electronic storage device (e.g., a computer-readable storage medium). The memory 304 may include one or more databases. Furthermore, the memory 304 may be configured to store information, data, content, applications, instructions, or the like for enabling the apparatus 300 to carry out various functions in accordance with example embodiments of the present invention.

The processor 302 may be embodied in a number of different ways and may, for example, include one or more processing devices configured to perform independently. In some preferred and non-limiting embodiments, the processor 302 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 302 may be configured to execute instructions stored in the memory 304 or otherwise accessible to the processor 302. In some preferred and non-limiting embodiments, the processor 302 may be configured to execute hard-coded functionalities. As such, whether configured by hardware or software methods, or by a combination thereof, the processor 302 may represent an entity (e.g., physically embodied in circuitry) capable of performing operations according to an embodiment of the present invention while configured accordingly. Alternatively, as another example, when the processor 302 is embodied as an executor of software instructions (e.g., computer program instructions), the instructions may specifically configure the processor 302 to perform the algorithms and/or operations described herein when the instructions are executed.

In some embodiments, the apparatus 300 may include input/output circuitry 306 that may, in turn, be in communication with processor 302 to provide output to the user and, in some embodiments, to receive an indication of a user input. The input/output circuitry 306 may comprise a user interface and may include a display, and may comprise a web user interface, a mobile application, a query-initiating computing device, a kiosk, or the like.

In embodiments in which the apparatus 300 is embodied by a limited interaction device, the input/output circuitry 306 includes a touch screen and does not include, or at least does not operatively engage (i.e., when configured in a table mode), other input accessories such as tactile keyboards, track pads, mice, etc. In other embodiments in which the apparatus is embodied by a non-limited interaction device, the input/output circuitry 306 may include may include at least one of a tactile keyboard (e.g., also referred to herein as keypad), a mouse, a joystick, a touch screen, touch areas, soft keys, and other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally, or alternatively, the communications circuitry 308 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

Example Data Flows and Operations

FIG. 4 is a flowchart diagram of an example process 400 for determining a predictive causal probability score data object associated with a service incident. Via the various operations of the process 400, the predictive causal analysis server computing device 106 can generate and output a predictive causal probability score data object. In some embodiments, the predictive causal analysis server computing device 106 may further include causing the generation of a causal change analysis interface to a client device. In some embodiments, the predictive causal analysis server computing device 106 may further include modifying an impacted service or upstream service to a historical version.

The process 400 begins at operation 401 when the predictive causal analysis server computing device 106 of the predictive causal analysis server system 101 monitors a complex federated service network to identify a service incident data object associated with a service incident. In some embodiments, the predictive causal analysis server computing device 106 may generate the service incident data object in response to detection of a service incident within one or more services of the federated service network 100. In some embodiments, a separate computing device, such as a client computing device 110 may generate the service incident data object and the predictive causal analysis server computing device 106 may identify the service incident data object. In some embodiments, the predictive causal analysis server computing device may receive the service incident data object from the client computing device 110 after the service incident data object has been generated. In some embodiments, the predictive causal analysis server computing device 106 may identify a service incident data object upon receipt of a request from one or more end users (i.e., as transmitted by a client device) to determine a predictive causal probability score data object associated with a service incident. The request may describe the service incident data object of interest.

In some embodiments, the service incident data object may include at least an impacted service identifier and one or more upstream service identifiers. A service incident may occur in response to one or more changes to code and/or operation definitions for a particular service or upstream service. The service incident may impact the service and/or downstream services such that said service and/or downstream services do not operate as intended. For example, the service and/or one or more downstream services may experience one or more runtime errors and/or may be unable to execute one or more operations. The service incident data object may be associated with a particular service incident and may describe the information relating to the service incident. In some embodiments, the service incident data object may include a service incident identifier which identifies the particular service incident, a service incident type, a service incident time, and/or the like.

In some embodiments, the service incident data object may further include the impacted service identifier of the service which was impacted by the service incident as well as one or more upstream service identifiers associated with the impacted service identifier. The one or more upstream service identifiers may be determined based at least in part on service information stored in the service registry, such as service registry 160. In some embodiments, the service incident data object may further include service metadata pertaining to the service identifier and/or one or more upstream service identifiers. For example, such metadata may include a priority category, service change time for one or more service changes or upstream service changes, a current service version number, one or more historical service version numbers, a risk assessment value for each service change to the service or upstream service, a snippet identifier, a branch identifier, a workspace identifier, a scope identifier, a user identifier, and/or the like.

At operation 402, the extractor engine 111 of predictive causal analysis server computing device 106 may extract one or more service incident analysis attributes based at least in part on the service incident data object. In some embodiments, the extractor engine 111 may use a service incident analysis layer to extract the one or more service incident analysis attributes. In some embodiments, the one or more service incident analysis attributes extracted by the service incident analysis layer may be configured by one or more end users via a client device 110. The one or more service incident analysis attributes may be provided as input to the predictive causal machine learning model.

In some embodiments, the service incident analysis layer is a pre-processing layer configured to extract one or more relevant features based at least in part on the service incident data object and generate one or more service incident analysis attributes. For example, the service incident analysis layer may extract a service incident time from the service incident data object. As another example, the service incident analysis layer may extract an impacted service identifier and one or more upstream service identifiers. The service incident analysis layer may then extract associated service metadata from service registry 160. For example, the service incident analysis layer may extract a service change time for one or more service changes or upstream service changes, a current service version number, one or more historical service version numbers, a risk assessment value for each service change to the service or upstream service, and/or the like from the service metadata.

In some embodiments, the extractor engine may be configured with a change time window indicative of a time frame for which to extract service incident analysis attributes from the service or upstream service. For example, a particular change time window may be 30 days such that any service changes or upstream service changes made 30 days prior are not included within the one or more service incident analysis attributes. In some embodiments, the change time window is configured by an end user. In some embodiments, the change time window is automatically determined by the predictive causal analysis server computing device, such as by using the predictive causal machine learning model.

At operation 403, the service incident analysis engine 113 of the predictive causal analysis server computing device 106 generates a predictive causal probability score data object. The service incident analysis engine 113 may use a predictive causal machine learning model to generate the predictive causal probability score data object. In some embodiments, the predictive causal machine learning model may be configured to receive the one or more extracted service incident analysis attributes and generate the predictive causal probability score data object based at least in part on the service incident analysis attributes.

The predictive causal machine learning model may be configured to describe parameters, hyper-parameters, and/or stored operations of a machine learning model that is configured to process one or more service incident analysis attributes associated with service incident data object in order to generate a predictive causal probability score data object. The predictive causal probability score data object may include one or more predictive causal probability scores. Each predictive causal probability score may be associated with a particular service change associated with the impacted service identifier or upstream service change associated with the one or more upstream service identifiers. In some embodiments, the predictive causal machine learning model may be configured to determine a time of change value for each service change and upstream service change, which will be discussed in greater detail with respect to FIG. 5. The service incident analysis layer may determine the time of change value based at least in part on the service incident time associated with the service incident data object and a service change time associated with the particular service change or upstream service change. Alternatively, the predictive causal machine learning model may receive the time of change value as a service incident analysis attribute.

In some embodiments, the predictive causal machine learning model may be configured to determine a predictive causal probability score for a service change or upstream service change based at least in part on the corresponding time of change value. In some embodiments, the predictive causal machine learning model may be configured to determine a predictive causal probability score based at least in part on a risk assessment value for the particular service change or upstream service change. In some embodiments, the predictive causal machine learning model is a machine learning model comprising a neural network framework. In some embodiments, the predictive causal machine learning model is a sequence-to-sequence (seq2seq) machine learning model. The generated predictive causal probability score data object is configured to describe one or more predictive causal probability scores. The one or more predictive causal probability scores may be based at least in part on a machine learned correlation between the one or more service incident analysis attributes and one or more service changes or upstream service changes, which will be discussed further with respect to FIG. 6. For example, a predictive causal probability score may be a value between 0 and 1, where 0 indicates no probability that the service change was a cause contributor for the service incident and 1 indicates the service change was absolutely a cause contributor for the service incident. As another example, a predictive causal probability score may be a percentage between 0 and 100, where 0 indicates no probability that the service change was a cause contributor for the service incident and 100 indicates the service change was absolutely a cause contributor for the service incident. In some embodiments, the parameters and/or hyper-parameters of a predictive causal machine learning model may be represented as values in a one-dimensional array, such as a vector, or a two-dimensional array, such as a matrix.

The predictive causal probability score data object may include one or more predictive causal probability scores. Each predictive causal probability score may be associated with a particular service change associated with the impacted service identifier or a particular upstream service change associated with an upstream service identifier. A predictive causal probability score may be indicative of the probability a corresponding service change (e.g., impacted service change or upstream service change) is a cause contributor of the service incident described by the service incident data object.

In some embodiments, the predictive causal machine learning model may determine one or more services changes or upstream service changes associated with a predictive causal probability score which satisfies one or more threshold causal probability scores. Additionally or alternatively, the one or more threshold causal probability scores may be defined by one or more authorized end users, such as via a user interface. The predictive causal machine learning model may then include only those service changes or upstream service changes with predictive causal probability scores which satisfy the one or more threshold causal probability scores in the predictive causal probability score data object. For example, a threshold causal probability score of 70% may ensure only service changes or upstream service changes with predictive causal probability scores above 70% are included in the predictive causal probability score data object.

Alternatively, in some embodiments, the predictive causal machine learning model may determine one or more service changes or upstream service changes and include a desired service change number n of service changes or upstream service changes with predictive causal probability scores. The desired service change number n may be defined by one or more authorized end users, where the desired service change number n may range from 1 to the total number of services changes or upstream service changes considered. For example, if the predictive causal machine learning model determined predictive causal probability scores for 20 services changes or upstream service changes, the desired service change number n may range from 1 to 20. If the desired service change number n is defined as 10, the predictive causal machine learning model may ensure 10 service changes or upstream service changes associated with highest predictive causal probability scores are included in the predictive causal probability score data object. In some embodiments, operation 403 may be performed in accordance with the various operations of the process 500 depicted in FIG. 5, which is a flowchart diagram of an example process for generating a predictive causal probability score using a predictive causal machine learning model.

The process 500 begins at operation 501 when the service incident analysis engine 113 of the predictive causal analysis server computing device 106 determines a time score value for each service change and upstream service change. The service incident analysis engine 113 may using the predictive causal machine learning model to determine a time score value for each service change and upstream service change. In some embodiments, the time score value may be determined based at least in part on the service incident time associated with the service incident data object and a service change time associated with the particular service change or upstream service change. In some embodiments, the predictive causal machine learning model may further determine a rate of decay for a service change. In some embodiments, the rate of decay for a service change may be based at least in part on a machine learned correlation between one or more training service incident analysis attributes and one or more service changes or upstream service changes. The rate of decay may be indicative of the rate at which a service change likelihood decreases as a potential cause contributor for the service incident. In some embodiments, the predictive causal machine learning model may then determine the time score value based at least in part on the service incident time associated with the service incident data object, the service change time associated with the particular service change or upstream service change, and the rate of decay for a service change. For example, in some embodiments, the time score for a particular service change may be given by equation 1:

$$S_T = \max\left(1, \left(T_D + \left(\frac{T_{SD}}{T_{avg}}\right)\right)\right) * \left(\frac{1}{T_D}\right)^{\frac{T_E}{T_D}} \qquad \text{Equation 1}$$

In the above equation, the time score $S_T$ is given as a function of a rate of decay $T_D$, a standard deviation between the service incident time and a service change time $T_{SD}$, an average of the service incident time and a service change time $T_{avg}$, and the difference in time between the service incident time and a service change time $T_E$.

At operation 502, the service incident analysis engine 113 of the predictive causal analysis server computing device 106 determines a risk assessment value for each service change and upstream service change. The service incident analysis engine 113 may use the predictive causal machine learning model to determine the one or more risk assessment values. In some embodiments, the risk assessment value for each service change and upstream service change may be provided by one or more service incident analysis attributes.

In some embodiments, the risk assessment value for each service change and upstream service change may be determined by extracting the risk assessment value from the associated metadata for each service change and upstream service change. The risk assessment value may be based at least in part on whether there is a conflicting change alongside the service change or upstream service change during a given time window, an incident history of the affected service pertaining to the service change or upstream service change, the time window when the service change or upstream service change was is performed (e.g., did the service change or upstream service change occur during a maintenance time window), the presence of a rollback and validation plan associated with the service change or upstream service change, and/or the like.

Alternatively, in some embodiments the risk assessment value is assigned by one or more authorized end users. Each risk assessment value may be a value indicative of the risk associated with each particular service change. The risk assessment value may be based at least in part on a variety of factors. For example, the risk assessment value may be based at least in part on the priority category for a particular service, a service risk assessment associated with particular service change, a frequency of service changes, and/or the like. In some embodiments, the risk assessment value for each service change is determined by a different computing device, such as a client computing device 110 and is included in the metadata of the particular service for the service version associated with the service change. In some embodiments, the risk assessment value is extracted by the service incident analysis layer as a service incident analysis attribute.

At operation 503, the service incident analysis engine 113 of the predictive causal analysis server computing device 106 determines a predictive causal probability score for each service (i.e., the affected service and one or more upstream services). The service incident analysis engine 113 may use the predictive causal machine learning model to determine each predictive causal probability score. In some embodiments, the predictive causal machine learning model may be configured to determine a predictive causal probability score for a service based at least in part on the associated time score and/or risk assessment value associated with the service. In some embodiments, the predictive causal machine learning model may apply a weight to each of the time score and/or risk assessment value to generate the predictive causal probability score for the service. The applied weight may be a machine learned correlation parameter determined through training the predictive causal machine learning model, as will be discussed in greater detail with respect to FIG. 6.

Figure 6:
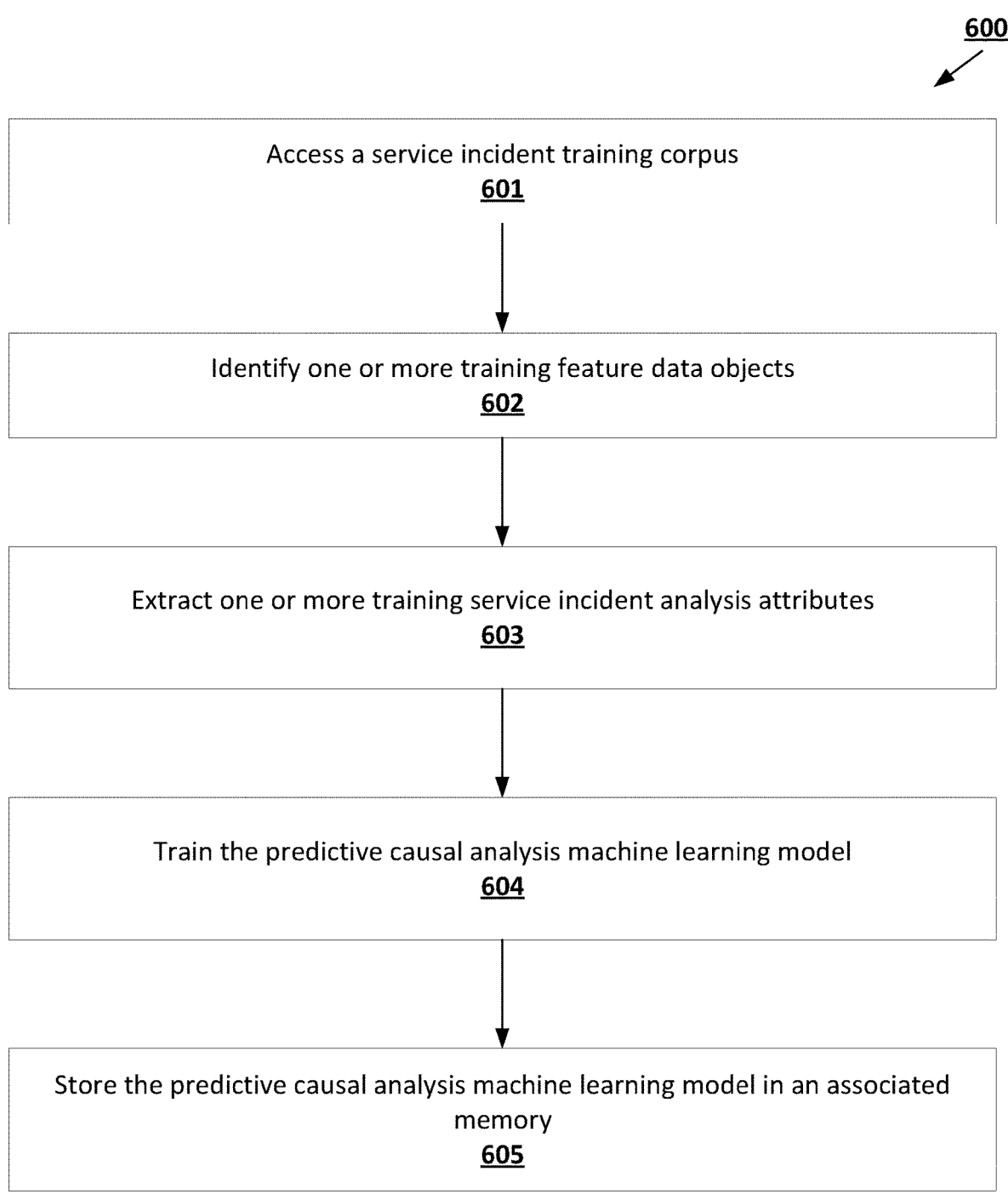
FIG. 6 is a flowchart diagram of an example process for performing a predictive causal analysis generation routine to train a predictive causal machine learning model in accordance with at least some embodiments of the present invention.

In some embodiments, operation 403 may additionally or alternatively be performed in accordance with the various operations of the process 600 depicted in FIG. 6, which is a flowchart diagram of an example process for training a predictive causal machine learning model.

The process 600 begins at operation 601 when the training engine 112 of the predictive causal analysis server computing device 106 accesses a service incident training corpus. The service incident training corpus may include a training routine for the predictive causal machine learning model that may be stored in the training data store 122 of the storage subsystem 108. The service incident training corpus may include a plurality of service incident data objects, impacted service data, and upstream service data.

At operation 602, the training engine 112 of the predictive causal analysis server computing device 106 may identify one or more training feature data objects. In some embodiments, each training feature data object may include a service incident data object, and impacted service data and upstream service data corresponding to the service incident described by the service incident data object. In some embodiments, the training feature data object further includes a ground-truth service indication indicative of which service change or upstream service change is a cause contributor of the service incident. In some embodiments, the impacted service data and upstream service data includes at least a risk assessment value and service change time for each service change. In some embodiments, the service incident data object includes at least a service incident time.

At operation 603, the extractor engine 111 and/or alternatively, the training engine 112, of the predictive causal analysis server computing device 106 extracts one or more training service incident analysis attributes. The training service incident analysis attributes may be extracted based at least in part on the identified training feature data objects. In some embodiments, the one or more training service incident analysis attributes may describe one or more relevant features of the one or more training feature data objects. For example, the one or more training service incident analysis attributes may include a risk assessment value for each service change and upstream service change, a service change time for each service change and upstream service change, and a service incident time for the service incident. In some embodiments, both the training engine 112 and service incident analysis engine 113 may use the service risk analysis processing layer of extractor engine 111 to extract one or more training service incident analysis attributes and/or one or more service incident analysis attributes.

At operation 604, the training engine 112 of the predictive causal analysis server computing device 106 may train the predictive causal machine learning model. The predictive causal machine learning model may be trained using any suitable training techniques, such as by using an optimization algorithm. Via such training techniques, the predictive causal machine learning model may be trained to determine a machine learned correlation between the one or more training service incident analysis attributes and one or more service changes or upstream service changes corresponding to an impacted service identifier or one or more upstream service identifiers. In some embodiments, the predictive causal machine learning model may be trained to determine a machine learned correlation rate of decay for a service change based at least in part on the machine learned correlation between the one or more training service incident analysis attributes and one or more service changes or upstream service changes corresponding to an impacted service identifier or one or more upstream service identifiers.

The predictive causal machine learning model may be re-trained periodically, semi-periodically, or in response to a training event. A training event may include one or more events which trigger the retraining of the predictive causal machine learning model. For example, a training event may include a user request to retrain the predictive causal machine learning model. As another example, a training event may include identifying a service incident data object. In this way, the predictive causal machine learning model may be iteratively trained and updated such that the one or more predictive causal probability scores described by the predictive causal probability score data object reflects an accurate determination of the service change which most likely is a cause contributor of the service incident.

At operation 605, the training engine 112 of the predictive causal analysis server computing device 106 may store the predictive causal machine learning model in an associated memory, such as in model definition data store 121 of the storage subsystem 108. The trained predictive causal machine learning model may be accessed by the service incident analysis engine 113 of the predictive causal analysis server computing device 106, such as for use in conjunction with the operations described in FIG. 4.

Returning now to FIG. 4, at operation 404, the service incident analysis engine 113 of predictive causal analysis server computing device 106 outputs the predictive causal probability score data object. The service incident analysis engine 113 may output the predictive causal probability score data object such that it may be provided to one or more computing entities, such as one or more client computing devices 110.

In some embodiments, operation 404 may additionally or alternatively be performed in accordance with the various operations of the process 700 depicted in FIG. 7, which is a flowchart diagram of an example process for modifying an impacted service or upstream service.

In some embodiments, one or more end users may opt-in to a program to allow for one or more automatic predictive actions to be performed based at least in part on the predictive causal probability score data object. In some embodiments, an end user may opt-in to a program that allows him/her to set one or more certainty thresholds and one or more corresponding actions in response to determining a predictive causal probability score satisfies the one or more certainty thresholds.

The process 700 begins at operation 701 when the service incident analysis engine 113 of the predictive causal analysis server computing device 106 whether the service change or upstream service change associated with the largest predictive causal probability score satisfies one or more certainty thresholds. In some embodiments, a certainty threshold may include one or more values predictive causal probability score values thresholds. For example, a certainty threshold may include an 80% predictive causal probability score value threshold. As such, the largest predictive causal probability score for the corresponding service change or upstream service change must have a predictive causal probability score value of at least 80%.

In some embodiments, certainty threshold may be relative to one or more other predictive causal probability scores for one or more other service changes or upstream service changes. For example, a certainty threshold may define a condition that the service change or upstream service change associated with the largest predictive causal probability score must be at least 10% greater than the next largest predictive causal probability score.

At operation 702 the service incident analysis engine 113 of the predictive causal analysis server computing device 106 may modify the impacted service or upstream service associated with the service change or upstream service change associated with the largest predictive causal probability score to a historical version in an instance the service change or upstream service change satisfies one or more certainty threshold scores. In some embodiments, the service incident analysis engine 113 may select a historical version of the service or upstream service to which to modify the service or upstream service. In some embodiments, the selected historical version may be the version directly prior to the version associated with the service change or upstream service change. For example, if a service change that occurred at 11:00 am on October 2nd is associated with the largest predictive causal probability score, the service incident analysis engine 113 may determine to modify the service to the version prior to that service change. In some embodiments, the selected historical version may be any version of the service or upstream service prior to the version associated with the service change or upstream service change.

In some embodiments, the service incident analysis engine 113 may use one or more modification policies to determine which historical version of the service or upstream service to which to modify the service or upstream service. In some embodiments, a modification policy may be stored with the service repository 109a. Each service or upstream service may be associated with a particular modification policy. A modification policy may define one or more parameters for a modification to a service or upstream service. In particular, a modification policy may describe which services and/or upstream services and modified, a modification order for one or more services and/or upstream services, a certainty threshold score which must be satisfied for the modification of the service and/or upstream service.

For example, a third historical version of service A may be associated with the largest predictive causal probability score. The modification policy corresponding to service A may cause the service incident analysis engine 113 to modify service A to a second historical version. Alternatively, the modification policy corresponding to service A may cause the service incident analysis engine 113 to modify service A to a second historical version in an instance the second historical version of service A is associated with a predictive causal probability score that does not satisfy one or more certainty threshold scores. Otherwise, the service incident analysis engine 113 may modify service A to the most recent historical version of service A associated with a predictive causal probability score that does not satisfy one or more certainty threshold scores.

As another example, a third historical version of service A may be associated with the largest predictive causal probability score, a fourth historical version of service B, which is an upstream service of service A, may be associated with the second largest predictive causal probability score, and a fifth historical version of service C, which is an upstream service of service B, may be associated with the third largest predictive causal probability score. The modification policy corresponding to service A, service B, and/or service C may cause the service incident analysis engine 113 modify service A to a second historical version, service B to a third historical version, and service C to a fourth historical version simultaneously in an instance each predictive causal probability score for service A, service B, and/or service C satisfies the one or more certainty threshold scores.

In some embodiments, upon modification of the impacted service or upstream service, the service incident analysis engine 113 may generate a modification notification indicative that the service or upstream service has been automatically modified to a historical version and may further include the version, associated timestamp for the selected version, and/or the like. The service incident analysis engine 113 may output the modification notification to one or more client computing devices 110. As such, one or more end users may be informed of the modification of the service or upstream service.

Returning now to FIG. 4, at operation 406, the predictive causal analysis server computing device 106 of the predictive causal analysis server system 101 causes the generation of a causal change analysis interface on one or more client devices. The causal change analysis interface may include multiple areas, where each area may be situated in relation to one or more other interface areas of the electronic interface. An interface area may be comprised of groupings of pixels, or may be defined according to coordinates of a display device configured to render the interface. A size of an interface may be adjusted according to parameters associated with the display device. An interface area may include one or more interface elements. For example, an interface element may include a visualization. In certain embodiments, an interface area may include one or more graphical elements and/or or more textual elements. In certain embodiments, an interface area may be void of an interface element and/or a visualization. In certain embodiments, an interface area may include a search graphical control element and/or one or more other interactive interface elements.

In particular, the causal change analysis interface may include a service incident element which is rendered based at least in part on the service incident data object. The service incident element may indicate one or more associated attributes of the service incident data object. For example, the service incident element may include the service incident time, the service incident type, the affected service, the one or more upstream services, and/or the like.

In some embodiments, the causal change analysis interface may further include a predictive causal probability score element which is rendered based at least in part on the predictive causal probability score data object. The causal change analysis interface may indicate one or more of the affected service changes or upstream service changes and information regarding the particular service as well as the corresponding predictive causal probability score. In some embodiments, the causal change analysis interface may rank the service changes and upstream service changes in descending order such that the service change or upstream service change associated with the largest predictive causal probability score is listed at the top. As such, end users of the one or more client devices 110 may be made aware of the associated service and upstream service predictive causal probability regarding the particular service incident, thus allowing the one or more end users to more quickly determine and make a more informed decision regarding what service likely is a cause contributor of the service incident and which historical version of the service the service should be modified or reverted to.

Figure 8:
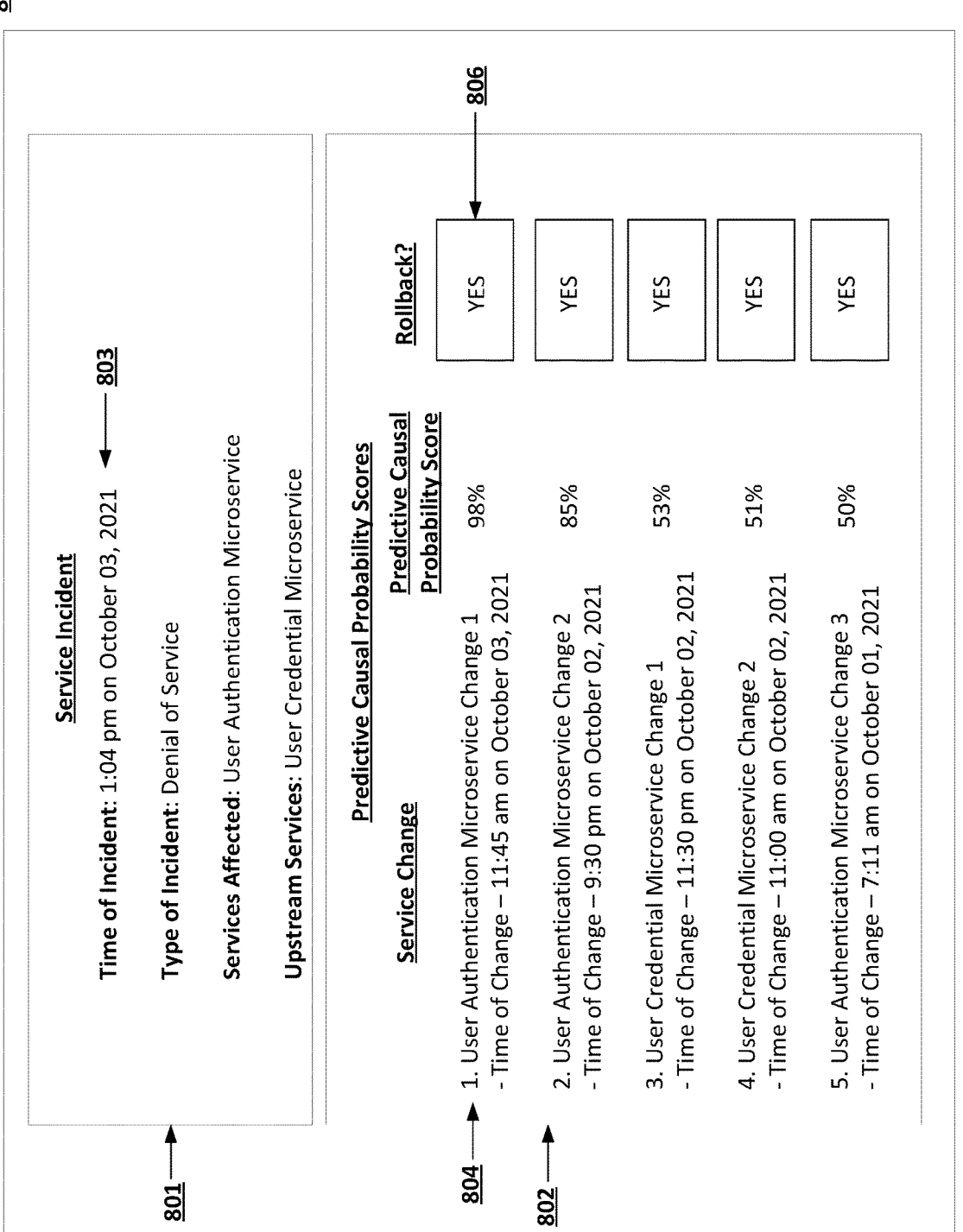
FIG. 8 illustrates an example causal change analysis interface in accordance with one or more embodiments of the present disclosure.

FIG. 8 depicts an example causal change analysis interface 800 in accordance with one or more embodiments of the present disclosure. The causal change analysis interface may be displayed on a user interface (e.g., a graphical user interface) of a client device (e.g., the client device 110) to facilitate user interaction with the causal change analysis interface 800. The causal change analysis interface 800 may include a service incident element 801, a predictive causal probability score element 802, and/or the like.

In some embodiments, the causal change analysis interface 800 may be visually depicted in a variety of ways. For example, the causal change analysis interface 800 may be colored such that the particular color of the predictive causal probability score element 802 is indicative of a ranking of the services changes and upstream service changes. For example, the service change 804 associated with the largest predictive causal probability score may be colored in red, the middle service changes colored in yellow, and the bottommost service changes colored in green.

In some embodiments, the predictive causal probability score element 802 may include a manual user interactable element 806 which a user may use to interact with the causal change analysis interface 800 and cause the predictive causal analysis server computing device 106 to modify corresponding impacted service or upstream service associated with the service change or upstream service change. For example, a user may interact with (e.g., click, touch, give a voice command, etc.) the manual user interactable element 806 associated with service change 804 to cause the predictive causal analysis server computing device 106 to modify the service associated with the service change 804 to a prior version.

As such, the end users of a client device may be presented with an overview of the service changes which most likely is a cause contributor of the service incident. In this way, the one or end users may easily view the particular service change and the associated predictive causal probability score.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web components, web services, web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's query-initiating computing device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a query-initiating computing device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., a Hypertext Markup Language (HTML) page) to a query-initiating computing device (e.g., for purposes of displaying information/data to and receiving user input from a user interacting with the query-initiating computing device). Information/data generated at the query-initiating computing device (e.g., a result of the user interaction) can be received from the query-initiating computing device at the server.

While this specification contains many specific implementation details, these should not be construed as limitations on the scope of any disclosures or of what may be claimed, but rather as description of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in incremental order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a product or packaged into multiple products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or incremental order, to achieve desirable results, unless described otherwise. In certain implementations, multitasking and parallel processing may be advantageous.

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed is:

1. An apparatus comprising at least one processor and at least one memory, the at least one memory having computer-coded instructions therein, wherein the computer-coded instructions are configured to, in execution with the at least one processor, cause the apparatus to:

identify a service incident data object associated with a service incident and a service incident time, the service incident data object comprising an impacted service identifier and one or more upstream service identifiers;

generate, using a predictive causal machine learning model, a predictive causal probability score data object based at least in part on the service incident time associated with the service incident data object, wherein (i) the predictive causal probability score data object describes at least one predictive causal probability score, (ii) the at least one predictive causal probability score is indicative of a probability at least one corresponding service change or upstream service change is a cause contributor of the service incident described by the service incident data object, and (iii) the at least one predictive causal probability score is based at least in part on a risk assessment value for the at least one corresponding service change or upstream service change, wherein the risk assessment value is determined based at least in part on (i) an incident history of one or more affected services associated with the at least one corresponding service change or upstream service change and (ii) a conflicting change associated with a change time window corresponding to the at least one service change or upstream service change;

cause generation of a causal change analysis interface based on the predictive causal probability score data object, wherein the causal change analysis interface comprises:

a service incident element that describes at least one impacted service or upstream service, and a user interactable element rendered in association with at least one service change or upstream service change, wherein the at least one service change or upstream service change is identified according to the at least one predictive causal probability score;

receive a user interaction via the user interactable element of the causal change analysis interface, wherein the user interaction indicates a modification of the at least one impacted service or upstream service; and update the at least one impacted service or upstream service to reflect the modification as indicated by the user interaction received via the user interactable element.

2. The apparatus of claim 1, wherein generating the predictive causal probability score data object further comprises computer-coded instructions further configured to, in execution with the at least one processor, cause the apparatus to:

determine a time score value for the at least one service change or upstream service change, wherein the time score value is based at least in part on the service incident time associated with the service incident data object and a service change time associated with the at least one service change or upstream service change; and generate, using the predictive causal machine learning model, the at least one predictive causal probability score for the at least one service change or upstream service change based at least in part on the time score value.

3. The apparatus of claim 1, wherein generating the predictive causal probability score data object further comprises computer-coded instructions further configured to, in execution with the at least one processor, cause the apparatus to:

determine the risk assessment value for the at least one service change or upstream service change, wherein the risk assessment value is further based at least in part on one or more change risk factors associated with a corresponding impacted service identifier or upstream service identifier.

4. The apparatus of claim 1, wherein the computer-coded instructions are further configured to, in execution with the at least one processor, cause the apparatus to:

select one or more service changes and upstream service changes for which to generate the at least one predictive causal probability score based at least in part on the change time window.

5. The apparatus of claim 1, wherein generating the predictive causal probability score data object based at least in part on the service incident time associated with the service incident data object further comprises the computer-coded instructions further configured to, in execution with the at least one processor, cause the apparatus to:

extract, using a service incident analysis layer, one or more service incident analysis attributes; and generate, using the predictive causal machine learning model, the predictive causal probability score data object based at least in part on the one or more service incident analysis attributes.

6. The apparatus of claim 1, wherein the computer-coded instructions are further configured to, in execution with the at least one processor, cause the apparatus to:

determine one or more service changes or upstream service changes associated with predictive causal probability scores which satisfy one or more threshold predictive causal probability scores; and generate the predictive causal probability score data object, wherein the predictive causal probability score data object includes only the one or more service changes or upstream service changes which satisfy the one or more threshold predictive causal probability scores.

7. The apparatus of claim 1, wherein the computer-coded instructions are further configured to, in execution with the at least one processor, cause the apparatus to:

determine one or more service changes or upstream service changes associated with predictive causal probability scores which satisfy one or more threshold predictive causal probability scores; and modify an impacted service or upstream service associated with the one or more service changes or upstream service changes associated with a largest predictive causal probability score to a historical version.

8. The apparatus of claim 1, wherein the computer-coded instructions are further configured to, in execution with the at least one processor, cause the apparatus to:

determine one or more service changes or upstream service changes associated with predictive causal probability scores which satisfy one or more threshold predictive causal probability scores;

determine whether the one or more service changes or upstream service changes associated with a largest predictive causal probability score satisfies one or more certainty threshold scores; and in an instance where the one or more service changes or upstream service changes associated with the largest predictive causal probability score satisfy the one or more certainty threshold scores, modify an impacted service or upstream service associated with the one or more service changes or upstream service changes associated with the largest predictive causal probability score to a historical version.

9. The apparatus of claim 8, wherein the predictive causal probability score data object comprises a ranked list of the one or more service changes or upstream service changes based at least in part on a corresponding predictive causal probability score for the at least one service change or upstream service change.

10. The apparatus of claim 1, wherein the causal change analysis interface further comprises a predictive causal probability score element listing at least one service change or upstream service change associated with the at least one predictive causal probability score.

11. The apparatus of claim 1, wherein the computer-coded instructions to update the at least one impacted service or upstream service to reflect the modification as indicated by the user interaction received by the user interaction received via the user interactable element comprise instructions to revert the at least one impacted service or upstream service to a historical state.

12. The apparatus of claim 1, wherein the computer-coded instructions to cause generation of the causal change analysis interface based on the predictive causal probability score data object further comprise instructions to generate the causal change analysis interface on one or more client devices.

13. The apparatus of claim 1, wherein the at least one predictive causal probability score is associated with a service change associated with the impacted service identifier or a upstream service change associated with the one or more upstream service identifiers.

14. A computer-implemented method comprising:

identifying, using one or more processors, a service incident data object associated with a service incident and a service incident time, the service incident data object comprising an impacted service identifier and one or more upstream service identifiers;

generating, using the one or more processors and a predictive causal machine learning model, a predictive causal probability score data object based at least in part on the service incident time associated with the service incident data object, wherein (i) the predictive causal probability score data object describes at least one predictive causal probability score, (ii) the at least one predictive causal probability score is indicative of a probability a corresponding service change or upstream service change is a cause contributor of the service incident described by the service incident data object, and (iii) the at least one predictive causal probability score is based at least in part on a risk assessment value for the corresponding service change or upstream service change, wherein the risk assessment value is determined based at least in part on (i) an incident history of one or more affected services associated with the at least one corresponding service change or upstream service change and (ii) a conflicting change associated with a change time window corresponding to the at least one service change or upstream service change;

causing generation of a causal change analysis interface based on the predictive causal probability score data object, wherein the causal change analysis interface comprises:

a service incident element that describes at least one impacted service or upstream service, and a user interactable element rendered in association with at least one service change or upstream service change, wherein the at least one service change or upstream service change is identified according to the at least one predictive causal probability score;

receiving a user interaction via the user interactable element of the causal change analysis interface, wherein the user interaction indicates a modification of the at least one impacted service or upstream service; and updating the at least one impacted service or upstream service to reflect the modification as indicated by the user interaction received via the user interactable element.

15. The computer-implemented method of claim 14, wherein generating the predictive causal probability score data object further comprises:

determining, using the one or more processors, a time score value for the at least one service change or upstream service change, wherein the time score value is based at least in part on the service incident time associated with the service incident data object and a service change time associated with the at least one service change or upstream service change; and generating, using the one or more processors and the predictive causal machine learning model, the at least one predictive causal probability score for the at least one service change or upstream service change based at least in part on the time score value.

16. The computer-implemented method of claim 14, wherein generating the predictive causal probability score data object further comprises:

determining, using the one or more processors, risk assessment value for the at least one service change and upstream service change, wherein the risk assessment value is based at least in part on one or more change risk factors associated with a corresponding impacted service identifier or upstream service identifier.

17. The computer-implemented method of claim 14, wherein the computer-implemented method further comprises:

selecting one or more service changes and upstream service changes for which to generate the at least one predictive causal probability score based at least in part on the change time window.

18. The computer-implemented method of claim 14, wherein generating the predictive causal probability score data object based at least in part on the service incident time associated with the service incident data object further comprises:

extracting, using the one or more processors and a service incident analysis layer, one or more service incident analysis attributes; and generating, using the one or more processors and the predictive causal machine learning model, the predictive causal probability score data object based at least in part on the one or more service incident analysis attributes.

19. The computer-implemented method of claim 14, further comprising:

determining, using the one or more processors, one or more service changes or upstream service changes associated with predictive causal probability scores which satisfy one or more threshold predictive causal probability scores; and generating, using the one or more processors, the predictive causal probability score data object, wherein the predictive causal probability score data object includes only the one or more service changes or upstream service changes which satisfy the one or more threshold predictive causal probability scores.

20. A computer program product comprising at least one memory, the at least one memory having computer-coded instructions therein, wherein the computer-coded instructions comprise instructions to:

identify a service incident data object associated with a service incident and a service incident time, the service incident data object comprising an impacted service identifier and one or more upstream service identifiers;

generate, using a predictive causal machine learning model, a predictive causal probability score data object based at least in part on the service incident time associated with the service incident data object, wherein (i) the predictive causal probability score data object describes at least one predictive causal probability score, (ii) the at least one predictive causal probability score is indicative of a probability a corresponding service change or corresponding upstream service change is a cause contributor of the service incident described by the service incident data object, and (iii) the at least one predictive causal probability score is based at least in part on a risk assessment value for the corresponding service change or upstream service change, wherein the risk assessment value is determined based at least in part on (i) an incident history of one or more affected services associated with the at least one corresponding service change or upstream service change and (ii) a conflicting change associated with a change time window corresponding to the at least one service change or upstream service change;

cause generation of a causal change analysis interface based on the predictive causal probability score data object, wherein the causal change analysis interface comprises:

a service incident element that describes at least one impacted service or upstream service, and a user interactable element rendered in association with at least one service change or upstream service change, wherein the at least one service change or upstream service change is identified according to the at least one predictive causal probability score;

receive a user interaction via the user interactable element of the causal change analysis interface, wherein the user interaction indicates a modification of the at least one impacted service or upstream service; and update the at least one impacted service or upstream service to reflect the modification as indicated by the user interaction received via the user interactable element.

* * * * *